Patented Feb. 18, 1930

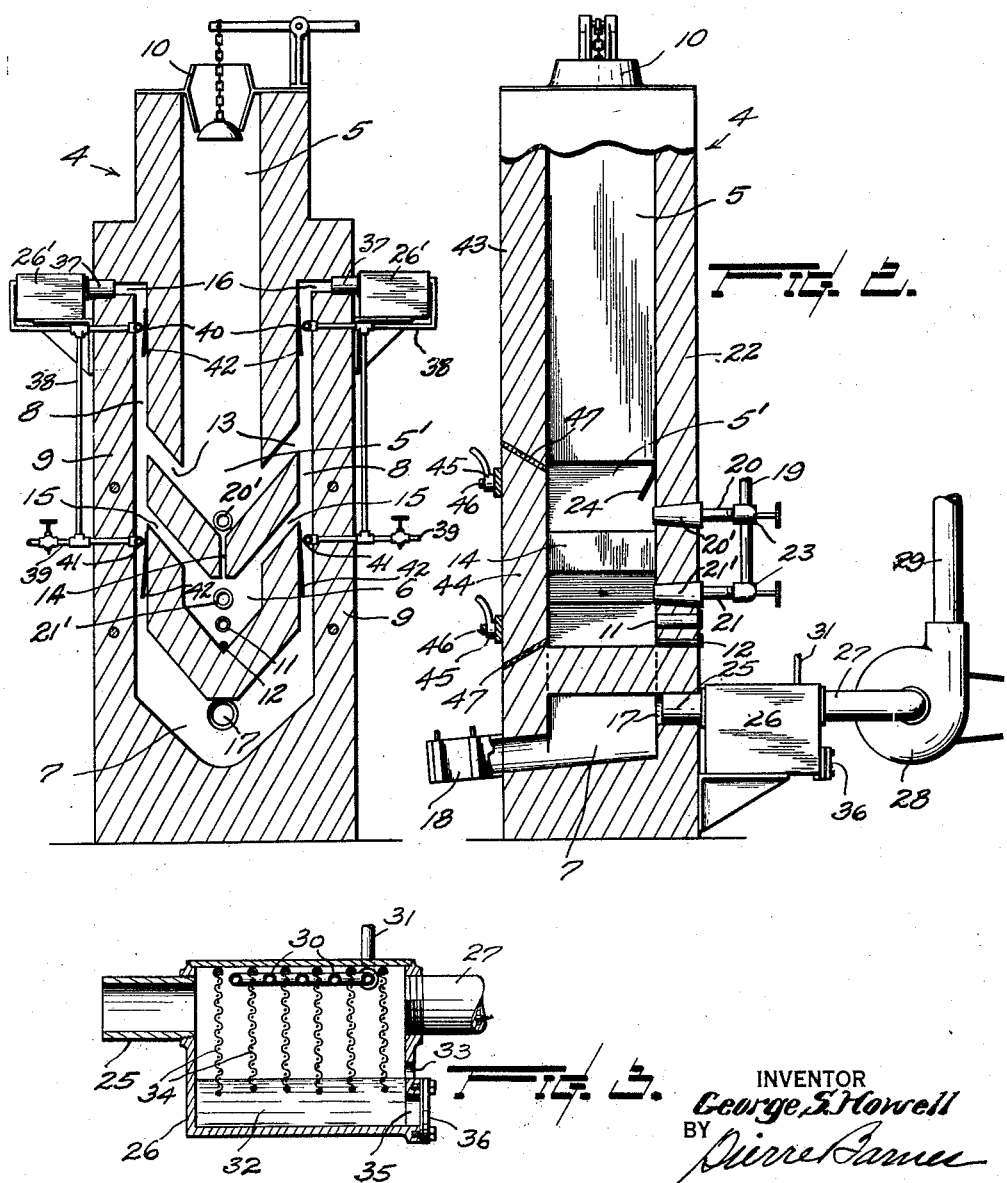

1,747,716

UNITED STATES PATENT OFFICE

GEORGE S. HOWELL, OF SEATTLE, WASHINGTON

APPARATUS FOR REDUCING ORES

Application filed November 14, 1928. Serial No. 319,211.

This invention relates to apparatus for reducing ores and recovering the metals therefrom.

The object of the invention is to provide a more simple and efficient method than hitherto for recovering merchantable products from ores with a minimum consumption of fuel.

More specific objects and advantages of the invention will appear in the following description.

An embodiment of my invention is shown in the accompanying drawing, in which—

Figure 1 is a vertical transverse section; Fig. 2 is a vertical longitudinal section of the apparatus as a whole; and Fig. 3 is a vertical longitudinal section of the condenser member shown in Fig. 2.

In said drawing, the reference numeral 4 represents, generally, a furnace of preferred construction which may be made of fire-brick or other heat refractory material. Said furnace is in the nature of a shell which is formed to provide centrally therein three chambers 5, 6 and 7, disposed one above another between vertical flues 8 provided in the side walls 9 of the furnace shell.

The upper portion of the chamber 5 serves as a receiving and preheating chamber, into which the ore with its fluxes is fed through a hopper 10 of known or suitable construction.

The lower portion $5^1$ of the chamber 5 serves as a reducing chamber having a funnel shaped floor constituting a bosh with a central outlet 14 through which molten material from the reducing chamber discharges into the chamber 6, hereinafter termed the intermediate chamber. This intermediate chamber is provided at different elevations with outlets 11 and 12 through which slag and molten metal respectively, are withdrawn.

Said reducing and intermediate chambers are communicatively connected by means of wing ducts 13 and 15 with the flues 8.

As shown in Fig. 1, said flues extend above the upper wing ducts 13 to outlets 16, one for each flue, which are located at about the midheight of the chamber 5. The lower ends of said ducts terminate in the lowermost chamber 7.

The chamber 7 is provided with an outlet 17 for the escape therefrom of gaseous products into a trap which will be presently described. The chamber 7 is also provided with a gate controlled spout 18 through which metals precipitated or collected in the bottom of the compartment 7 may be withdrawn.

19 represents a pipe leading from a reservoir or source (not shown) of a fluid hydrocarbon fuel, said pipe being provided with branches 20 and 21 which terminate in burners or tuyères $20^1$ and $21^1$ extending through the back wall 22 of the shell into the chambers $5^1$ and 6 medially of their widths. 23 represent valves for regulating the fuel supply to the respective burners.

A guard 24, as shown in Fig. 2, is provided advantageously above the burner $20^1$ in the chamber 6 to prevent material descending in the chamber $5^1$ from entering into or obstructing the orifice of the burner $21^1$.

The gas outlet 17 extending from the chamber 7 is connected by means of a nipple 25 with an end of the trap 26 above referred to, the other end of the trap being communicatively connected by means of a pipe 27 with a power actuated suction fan 28 having a pipe 29 for discharging non-condensible gases into the external atmosphere.

More particularly, the trap 26 through which exhaust gases from the furnace chamber 7 are drawn is subjected to the condensing action of a spray of water delivered from an assembly of sprinkling pipes 30 (Fig. 3) receiving water as from a service pipe 31.

A body of water, as indicated by 32, collects in the bottom of the trap 26 to a depth governed by the elevation of an overflow opening 33.

Provided within said trap is a series of foraminated baffles 34, which may consist of fine-mesh curtains through which gases entering the trap are compelled to pass before escaping through the pipe 27. As shown, the baffles 34 depend from the top wall of the trap and have the lower ends of some or all of the baffles extend into the body 32 of water whence, by capillary attraction, the water is caused to ascend the respective baffles to afford thereon films of water which is thus brought into contactual relation with the gases traveling through the trap.

The water screens, so to speak, thus provided act ancilliary to the water sprayed from the sprinkling pipes 30 to reduce the temperature of the gases admitted into the trap and saturate condensible contents thereof to promote the precipitation of the same into the body of water in the bottom of the vessel. The trap 26 thus serves to recover by condensation a large portion of the condensible gases which would otherwise be wasted.

Such condensations may from time to time be withdrawn as through a discharge opening 35 having a removable closure 36.

Traps $26^1$, preferably like that above described, are advantageously provided for the outlets 16 of the flues 8. In this instance, however, each of the traps $26^1$ is provided with a single connection 37 through which gases may both enter and return to and from the respective flues 8. The traps $26^1$, moreover, are provided interiorly with sprinkling pipes similar to those illustrated in Fig. 3 with respect to the trap 26 and into which spray water for condensation purposes is supplied through the medium of branches 38 from service pipes 39. Said service pipes 39 are also provided with branches terminating in sprinkling pipes 40 and 41 located within the flues 8, Fig. 1, above and below the ducts 13 and 15 respectively. 42 represent metal-plates positioned in said flues opposite the respective sprinkling pipes 40 and 41, to protect the shell from erosion and to facilitate the breaking up of the water spray played thereagainst.

The water thus produced in comminuted form in the flues has affinity for particles of matter which tends, when hot, to ascend the flues; but, upon uniting with the water, or water vapor, become cooler and heavier and fall into the chamber 7.

For cleaning, or other purposes, the front wall 43 of the furnace shell is provided with a removable section 44 giving access to the chambers 5 and 6. Said removable section may be held in place by means of clamping nuts 45 engaging screw threaded ends of bolts 46 secured to the furnace shell.

The opening in the shell provided for said section may be rendered air and gas tight by any suitable means such, for example, as with a luting 47.

In operation, the ore with its flux deposited in the chamber 5 descends by gravitation into the lower part $5^1$ thereof whereat it is reduced by means of the heat generated through the medium of the burner $20^1$. The resulting molten portion of the material, passing downwardly through the slot 14, falls into the second chamber 6 where it is subjected to a heat of higher temperature produced from the second burner $21^1$. The smoke of combustion and the gases volatilized from the material in both chambers 5 and 6 are withdrawn through the respective ducts 13 and 15 into the flues 8. The lighter portions of such gaseous products ascend the flues 8 from both sets of ducts into the region of action of the sprinklers 40, whereat the sprinkling water saturates or, at least, commingles with the gases to condense or render portions thereof heavier, which thereupon pass downwardly by their greater weight or by the suction created by the fan 28.

The gases which pass into the traps $26^1$ are subjected to the action of the sprays therein to effect the precipitation of condensed matter, and which may be removed upon occasion from the respective traps $26^1$.

The gases which are caused to descend the flues are exposed to the sprays from the sprinklers 41 and therebelow enter the compartment 7, condensations which occur either within the flues or the compartment 7 escape into the trap 26 to be treated as hereinbefore described. The solids and liquids recovered in the chamber 6 are withdrawn through the outlets 11 and 12 as slag and molten metal. And the material, other than gases which are collected in the compartment 7, is withdrawn through the delivery spout 18.

The construction of the now preferred embodiment of the invention and the manner of its operation will, it is thought, be understood from the foregoing description.

What I claim, is,—

1. An apparatus for reducing ores comprising, in combination, two chambers disposed one above the other between gas conducting flues, said chambers being connected with each other by a material feeding passage and with the flues by means of ducts, heat generating means provided for reducing the ore in the respective chambers, a gas collecting trap communicatively connected with the lower ends of said flues, said trap having an exhaust opening, means provided in the flues to effect the condensation of condensible portions of the gas received from said chambers, a compartment intermediate said flues and the trap for collecting condensations of gas occurring in said flues, and means to impart a suction through the trap to effect progressive movement of the gases liberated in said chambers from the latter through said flues and compartment to the trap to discharge from the exhaust opening thereof.

2. An apparatus for reducing ores as defined in claim 1, wherein means are provided for withdrawing molten metal from one of the chambers and said compartment.

3. An apparatus for reducing ores comprising, in combination, two chambers disposed one above the other between gas conducting flues, said chambers being connected with each other by a material feeding passage and with the flues by means of ducts, heat generating means provided for reducing the ore in the respective chambers, gas collecting traps connected to the upper ends of said flues, a gas collecting trap communicatively connected with the lower ends of said flues, said last named trap having an exhaust opening, means provided in the flues to effect the condensation of condensible portions of the gas received from said chambers, a compartment intermediate said flues and the last named trap for collecting condensations of gas occurring in said flues, and means to impart a suction through the last named trap to effect progressive movement of the gases liberated in said chambers from the latter through said flues and compartment to the last named trap to discharge from the exhaust opening thereof.

4. An apparatus for reducing ores as described in claim 3, wherein means are provided for withdrawing molten metal from said gas condensation compartment and the precipitated matter in said traps.

Signed at Seattle, Washington, this 3rd day of November, 1928.

GEORGE S. HOWELL.